Figure 5:
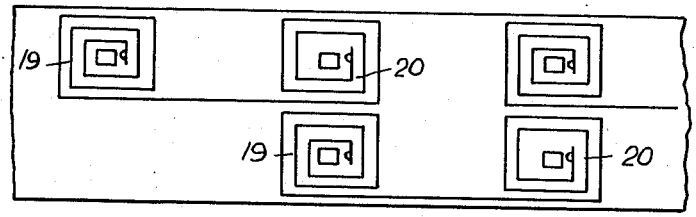

Jan. 19, 1954 P. EISLER 2,666,254
METHOD OF MANUFACTURING ELECTRICAL WINDINGS
Filed Oct. 4, 1949 2 Sheets-Sheet 1
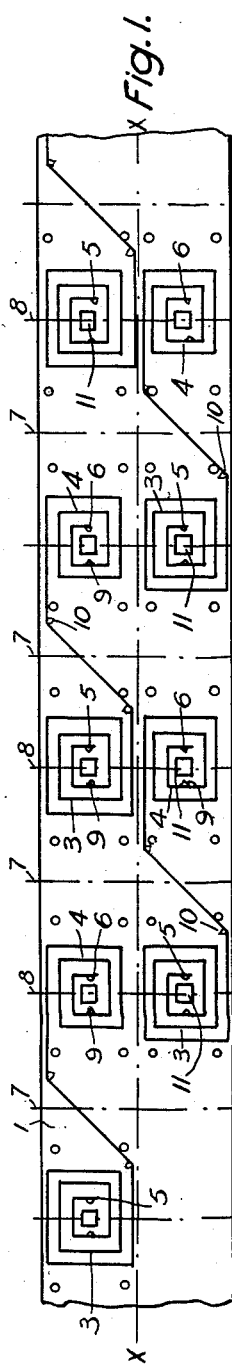
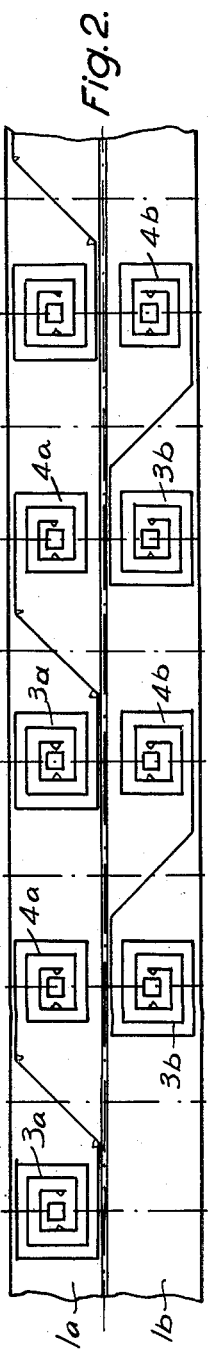
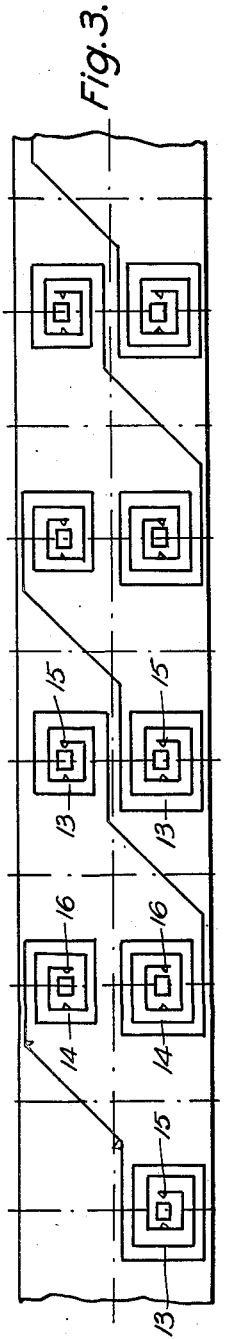
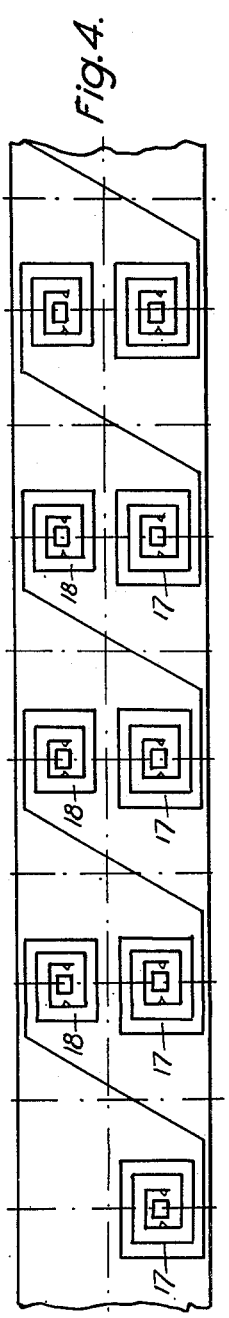
*Fig.1.* *Fig.2.* *Fig.3.* *Fig.4.*
INVENTOR
Paul Eisler
BY
ATTORNEY Jan. 19, 1954     P. EISLER     2,666,254
METHOD OF MANUFACTURING ELECTRICAL WINDINGS
Filed Oct. 4, 1949     2 Sheets-Sheet 2

INVENTOR
Paul Eisler
BY C.E. Odell
ATTORNEY

Patented Jan. 19, 1954

2,666,254

UNITED STATES PATENT OFFICE 2,666,254

METHOD OF MANUFACTURING ELECTRICAL WINDINGS

Paul Eisler, London, England, assignor to Hermoplast Limited, London, England, a corporation of Great Britain Application October 4, 1949, Serial No. 119,557

5 Claims. (Cl. 29—155.5)

The present invention relates to the production of electrical windings.

An object of the invention is to produce a continuous or indefinite length of composite material which comprises a succession of layers, each containing two or more spiral windings, which material can be cut into sections comprising one or more layers which constitute or can be connected to constitute a winding of the nature and value required. If all the windings are joined in series, an inductance results. But the invention contemplates connecting them in two groups whereby a transformer can be produced. The same result can be obtained by connecting several layers in two groups; close coupling is obtained by connecting the several layers so that the primary and secondary comprise alternating or interspersed layers. The invention further contemplates connection of successive layers in inductive opposition so that the complete section is a substantial non-inductive winding comprising a considerable length of conductor in a small space as may be desired for example in a heating device.

In accordance with the invention I make a composite structure in indefinite length and comprising a succession of substantially plane layers each containing within its thickness at least two spiral windings of conductive turns insulated from one another, so that the layer is perpendicular to the flux generated by the windings of the layer when in operation, successive layers or groups of layers constituting units cohering to neighboring units by a thin flat material containing at least one conductor so that the structure can be easily severed between the units by severing the said material, windings belonging to successive units being connected in series in one or more sets throughout the structure. I can then cut this into sections each comprising one or more units as required and if necessary interconnect the windings.

Preferably the conductive turns are of flat section material such as sheet metal, foil or flattened wire.

The structure above defined may be produced by bending an initially flat strip material incorporating conductors in a suitable pattern or form, and spaced by insulating material. Under bending I include any degree of sharpness of bending, from folding which is a sharp bend on a line, to winding which is a continuous bend.

In one form of the invention, a flat strip material comprises flat spiral windings in order on a flexible insulating support. The strip is first folded along its longitudinal mid axis, or what comes to the same thing, two strips each comprising half the pattern are superposed, the spirals are connected together, the folded or double strip is folded concertina fashion to bring all the windings into superposition. From this folded strip any desired number of folds can be cut off.

In another form of the invention, I produce a tape containing a plurality of preferably flat section conductors side by side, insulated from one another and I wind this into a succession of spirals with the cross-section of the strip axially disposed and with the tape leading from the outer end of each spiral to the inner end of the next. Here each spiral constitutes a unit and the units may be identical or they may differ from one another. Any required number can be cut off the succession and the end of the last spiral connected to the beginning of the first. Since the tape includes a plurality of conductors, interconnection can be effected in various ways according to the result desired, e. g. whether a simple inductance or a transformer is to be produced; parallel connections of any number of conductors up to the total in the strip can also be used to obtain greater carrying capacity.

Further objects and features of the invention will appear from the following description with reference to the accompanying diagrammatic drawings which illustrate examples embodying the invention.

Figure 6:
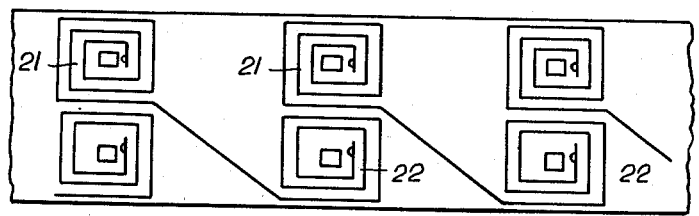
Figure 7:
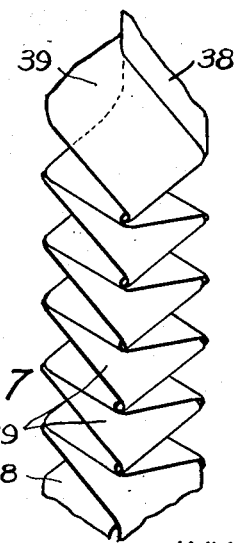

Figs. 1 to 6 show in plan various examples of the invention in the form first above described, and Fig. 7 shows in perspective a plaited structure incorporating a plurality of strips according to the first form of the invention.

As shown in Figure 1, I prepare on an insulating support 1, for example of impregnated paper or fabric, two series of repeating conductive patterns on opposite sides of the mid axis, $x$, $x$, each consisting of pairs of spirals 3, 4 in a generally S-like form, the ends of the two spirals being at the innermost turn. For simplicity the spiral conductor is indicated as a line, but it will in practice be relatively wide in the plane of the drawing and thin perpendicular to it. Also for simplicity a relatively coarse spiral is shown and all spirals are shown with the same number of turns both in each pair and on each side of the centre line. All the spirals in a series are equally spaced but one series is staggered half a pitch in relation to the other, and all ends 5, 6 are equidistant from the $x$ axis and the opposite pairs lie on the same transverse axes. In other words, seen in either longitudinal direction of strip 1, say from the left side, one spiral winding of each pair may be defined as the anterior winding and the other as the posterior winding of the pair. As will now be evident, each anterior winding 3 of one pair is disposed in transverse alignment with the posterior winding 4 of another pair. It will further be apparent that this definition of the relative winding position applies also when strip 1 is viewed from the right hand side, the only difference being that winding 3 then becomes the posterior winding and winding 4 the anterior winding of a pair. It will be seen that geometrically all the spirals are of identical hand but that electrically in any one pair of spirals constituting an S there is one right handed spiral and one left handed, that is current passing through the pair in series would circulate one way in one and the other in the other. If now the strip is doubled over along the $x$ axis, owing to the relative staggering of the two series, right and left handed spirals of the respective series will be superposed, but because of the doubling, one superposed spiral will be reversed in relation to the other so that if the two inner ends are joined, a current traversing both will circulate in the same direction over the whole of its passage. As the inner ends 5, 6 of the spirals are all equidistant and the opposite pairs lie on the same transverse axes, the inner ends 5, 6 of opposite pairs will be superposed and can be connected together mechanically and electrically as by riveted and soldered or welded joints. When so connected all the spirals of both series are connected in series in regular order, but as long as the strip is only doubled along the $x$ axis, successive interconnected superposed pairs of spirals will be alternately of opposite hands electrically, that is to say if the course of a current throughout the series is followed it will be found that the current will alternately circulate clockwise and counterclockwise in successive pairs of spirals. If now the doubled strip is folded zig zag or concertina fashion, by doubling in opposite directions alternately on transverse axes 7 midway between the transverse axes 8 of the spirals, all the spirals will be superposed and will be electrically of the same hand, so that the succcession of spirals will be inductively additive. A desired value can be obtained by cutting a section from the indefinite length of composite material, comprising an appropriate number of folds, and the end connections can be made to either the inner ends of the end spirals or by the aid of lugs 10 to the severed cross bars of the spirals at the two ends of the section, depending on where the section is cut off from the main length of material. Where the connection is made to the inner end of a spiral, a small adjustment may be made by connection to a lug 9 spaced in from the extreme end, for instance by half a turn as shown.

It will be understood that the successive spirals must be insulated from one another. If the original doubling on the $x$ axis is effected to keep the spirals on the outer faces, the support 1 will itself constitute insulation between them, but a further layer of insulation must be provided before the concertina folding is completed. This may comprise separate sheets of insulation between successive folds, or a layer may be secured over the two series of spirals before or after the original doubling. Alternatively, the original fold may be the other way, when insulation must be introduced between the two inside faces of the fold; such insulation may if desired be first secured over one or both series of spirals.

It will also be understood that the nature of the insulation must be such as will permit the necessary folding. Thus the support 1 may be wholly flexible, or it may be flexible only along the $x$ axis and the transverse axes 7.

It will further be understood that two separate supports each bearing one series of pairs of spirals may be used in which case the $x$ axis in Figure 1 represents the edges of these two strips. Instead of doubling the single strip 1, in this case the separate strips are superposed in corresponding fashion. Slight adjustments are possible by connecting together superposed lugs 9 instead of lugs 5 and 6, thus effectively reducing the corresponding spirals each by about half a turn.

Holes 11 through support 1 may be provided. As shown in Fig. 1, each of these holes is situated in the center of the respective spiral.

A further possibility which will reduce the amount of insulating material necessary, when two separate strips are used, is to make the spirals which are superposed by the first stage, to opposite hands geometrically. This is illustrated in Figure 2 in which 1a, 1b are the two strips. In this case the series 3b, 4b is geometrically to the opposite hand to the series 3a, 4a, and the superposition instead of being the equivalent of doubling about the $x$ axis of Figure 1 is a direct superposition so that the strip 1b is placed on the series 3a, 4a. Thus the strip 1b insulates the series 3a, 4a from the series 3b, 4b but additional insulation will be necessary between the spirals 3b and 4b only, when the concertina folding is effected. At this stage the strip 1a insulates the spirals 3a, 4a from one another.

Figure 3 shows another possibility. Here the two spirals 13, 14 of a pair are on opposite sides of the mid axis $x$ and they are connected together C fashion, i. e. they are geometrically to opposite hands but electrically to the same hand. When this structure is folded along the $x$ axis and the ends 15, 16 are interconnected, and the whole suitably insulated is then folded concertina fashion, an additive inductive effect is again obtained.

By constructing the above described embodiments with double intermeshed spirals, tightly coupled transformers can be made, the two series of spirals being respectively included in the primary and secondary windings. Another way of making transformers is to intermesh two concertina folded structures.

In some cases, for example for heating elements, non-inductive sections may be desired. These can be obtained by arranging the spirals as in Figures 4, 5 and 6. In Figure 4 an S arrangement is used but the two spirals of each pair 17, 18 are on opposite sides of the $x$ axis. In Figure 5 two series of C connected pairs of spirals 19, 20 are used to the same effect. Here the two series are on opposite sides of the $x$ axis but the same result can be obtained by using a single series of C connected pairs 21, 22 with the connecting bridge crossing the $x$ axis, as shown in Figure 6.

The actual production of the support and spiral conductor can be effected in various ways, for instance by the methods as described in my Patents Nos. 2,441,960, 2,582,685, 2,587,568 and 2,634,310 and in my co-pending application Ser. No. 11,797, filed February 27, 1948. I prefer to stamp the spirals out of copper foil while on a support suitable for the stamping operation, transfer them to a supporting insulating sheet, e. g. a strip of adhesive paper, fold this paper along the x axis (or superpose two separate strips where that method is used) join the superposed lugs at the ends of the spiral by welding or eyeletting and soldering, apply cover sheets, and fold in concertina fashion on the appropriate transverse lines. The supporting sheet may be punched with openings for the joints and if desired at the centres of the spirals.

A flexible but mechanically easily manipulated and self-supporting assembly suitable for immersion heating or other heating service can be made by plaiting a plurality of the described strips together. Non-inductive strips are preferably used, or if there is an even number, inductive strips arranged in opposition could be used. Fig. 7 shows a part of such an arrangement. In this there are two strips 38, 39 each of which is folded transversely over the other. The flexibility of the strips themselves and the clearances necessary in folding enable the plaited structure to be pulled out somewhat and to flex, but it is nevertheless sufficiently self-supporting to permit easy mechanical handling.

I claim:

1. The method of manufacturing an electric pathway pattern comprising the steps of forming on one side of a continuous insulation strip an identically repeating pattern of pairs of substantially flat electrically conductive spiral windings, the two windings of each pair being connected with their outer ends and the said pairs being disposed on the strip in two parallel rows in longitudinally uniform spacing so that each pair includes an anterior winding and a posterior winding (as seen in either one of the longitudinal directions of the strip) and each anterior winding in one row is transversely aligned with a posterior winding in the other row, folding the strip longitudinally between the two rows for placing each anterior winding in a superposed position with a posterior winding electrically separated by said insulation strip, and finally electrically connecting the inner ends of the superposed windings thereby joining the connected windings in circuit.

2. The method of manufacturing continuously connected layers of flat spiral coils in superposed position, the said method comprising the steps of forming on one side of a continuous insulation strip an identically repeating pattern of pairs of substantially flat electrically conductive spiral coils, the two coils of each pair being connected with their outer ends and the said pairs being disposed on the strip in two parallel rows in longitudinal uniform spacing so that each pair includes an anterior coil and a posterior coil (as seen in either one of the longitudinal directions of the strip) and that each anterior coil in one row is transversely aligned with a posterior coil in the other row, folding the strip longitudinally between the two rows for placing each anterior coil in a superposed position with a posterior coil electrically separated by said insulation strip, electrically connecting the inner ends of superposed coils through the strip thereby joining the connected coils in circuit, and pleating the longitudinally folded strip in accordion fashion so as to superpose all the coils.

3. The method according to claim 1, wherein the said rows of pairs of windings are so formed that one winding of each pair is situated in one row and the second winding in the other row.

4. The method of manufacturing an electrically conductive pathway pattern comprising the steps of forming on one side of a continuous insulation strip an identically repeating pattern of uniformly spaced pairs of substantially flat electrically conductive spiral windings, the two windings of each pair being connected with their outer ends and the said pairs being disposed in a longitudinal row, one winding of each pair constituting an anterior winding and the other a posterior winding (as seen in either longitudinal direction of the strip), superposing two lengths of said strip in a staggered relationship in which the anterior winding of each pair formed on one strip is in juxtaposition with the posterior winding of a pair formed on the other strip, and electrically connecting the inner ends of juxtaposed anterior and posterior windings and mechanically joining the two lengths of strips.

5. The method of manufacturing an electrically conductive pathway pattern comprising the steps of forming on a continuous insulation strip an identically repeating pattern of uniformly spaced pairs of substantially flat electrically conductive spiral windings, the two windings of each pair being connected with their outer ends and the said pairs being disposed in a longitudinal row, one winding of each pair constituting an anterior winding and the other a posterior winding (as seen in either longitudinal direction of the strip), superposing two lengths of said strip in a staggered relationship in which the anterior winding of each pair formed on one strip is in juxtaposition with the posterior winding of a pair formed on the other strip, electrically connecting the inner ends of juxtaposed anterior and posterior windings and mechanically joining the two lengths of strips, and pleating the two joint lengths of strips in accordion fashion so as to bring all the windings in superposed position.

PAUL EISLER.

References Cited in the file of this patent

UNITED STATES PATENTS

| Number | Name | Date |
|---|---|---|
| 1,563,731 | Ducas | Dec. 1, 1925 |
| 2,014,524 | Franz | Sept. 17, 1935 |
| 2,334,584 | Rich | Nov. 16, 1943 |
| 2,334,671 | Gibbons | Nov. 16, 1943 |
| 2,441,960 | Eisler | May 25, 1948 |
| 2,474,988 | Sargrove | July 5, 1949 |

OTHER REFERENCES

Printed Circuit Techniques, National Bureau of Standards Circular 468. Issued November 15, 1947, pages 17 and 18.